(12) United States Patent
Iwasaki et al.

(10) Patent No.: US 7,552,592 B2
(45) Date of Patent: Jun. 30, 2009

(54) MAGNETIC REFRIGERATOR

(75) Inventors: Hideo Iwasaki, Kawasaki (JP); Akihiro Kasahara, Sambu-gun (JP); Katsumi Hisano, Matsudo (JP); Akihiro Koga, Tokyo (JP); Akiko Saito, Kawasaki (JP); Tadahiko Kobayashi, Yokohama (JP); Takuya Takahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 476 days.

(21) Appl. No.: 11/533,063

(22) Filed: Sep. 19, 2006

(65) Prior Publication Data

US 2007/0125094 A1 Jun. 7, 2007

(30) Foreign Application Priority Data

Nov. 30, 2005 (JP) ............................. 2005-345465

(51) Int. Cl.
*F25B 21/00* (2006.01)
(52) U.S. Cl. ....................................................... 62/3.1
(58) Field of Classification Search ..................... 62/3.1
See application file for complete search history.

(56) References Cited

U.S. PATENT DOCUMENTS

| | | | | |
|---|---|---|---|---|
| 4,727,721 A * | 3/1988 | Peschka et al. | ............... | 62/3.1 |
| 5,091,361 A * | 2/1992 | Hed | ............... | 505/163 |
| 5,934,078 A * | 8/1999 | Lawton et al. | ............... | 62/3.1 |
| 6,446,441 B1 | 9/2002 | Dean | | |
| 6,467,274 B2 * | 10/2002 | Barclay et al. | ............... | 62/3.1 |
| 6,526,759 B2 | 3/2003 | Zimm et al. | | |
| 6,595,004 B1 * | 7/2003 | Ghoshal | ............... | 62/3.1 |
| 6,668,560 B2 * | 12/2003 | Zimm et al. | ............... | 62/3.1 |
| 2007/0125094 A1 | 6/2007 | Iwasaki et al. | | |

OTHER PUBLICATIONS

U.S. Appl. No. 11/385,726, filed Mar. 22, 2006, Tadahiko Kobayashi, et al.
U.S. Appl. No. 11/860,818, filed Sep. 25, 2007, Saito, et al.
U.S. Appl. No. 11/533,163, filed Sep. 19, 2006, Iwasaki, et al.
U.S. Appl. No. 11/533,063, filed Sep. 19, 2006, Iwasaki, et al.
U.S. Appl. No. 11/689,100, filed Mar. 21, 2007, Koga, et al.

* cited by examiner

*Primary Examiner*—William C Doerrler
(74) *Attorney, Agent, or Firm*—Oblon, Spivak, McClelland, Maier & Neustadt, P.C.

(57) ABSTRACT

In a magnetic refrigerator, a permanent magnet unit shaped like a hub is so rotated as to face an annular magnetic unit having magnetic blocks arranged in a circumferential direction. The permanent magnet unit is also arranged to be concentric with a magnetic unit and has an inner and outer diameters substantially equal to those of the magnetic unit. Each of the magnetic blocks has positive and negative magnetic segments alternately arranged with predetermined gaps. As the permanent magnet unit rotates, heat conducting members are inserted into and removed from the gaps between the magnetic segments of the magnetic block. This allows heat generated from the magnetic segments to conduct in one direction.

23 Claims, 7 Drawing Sheets

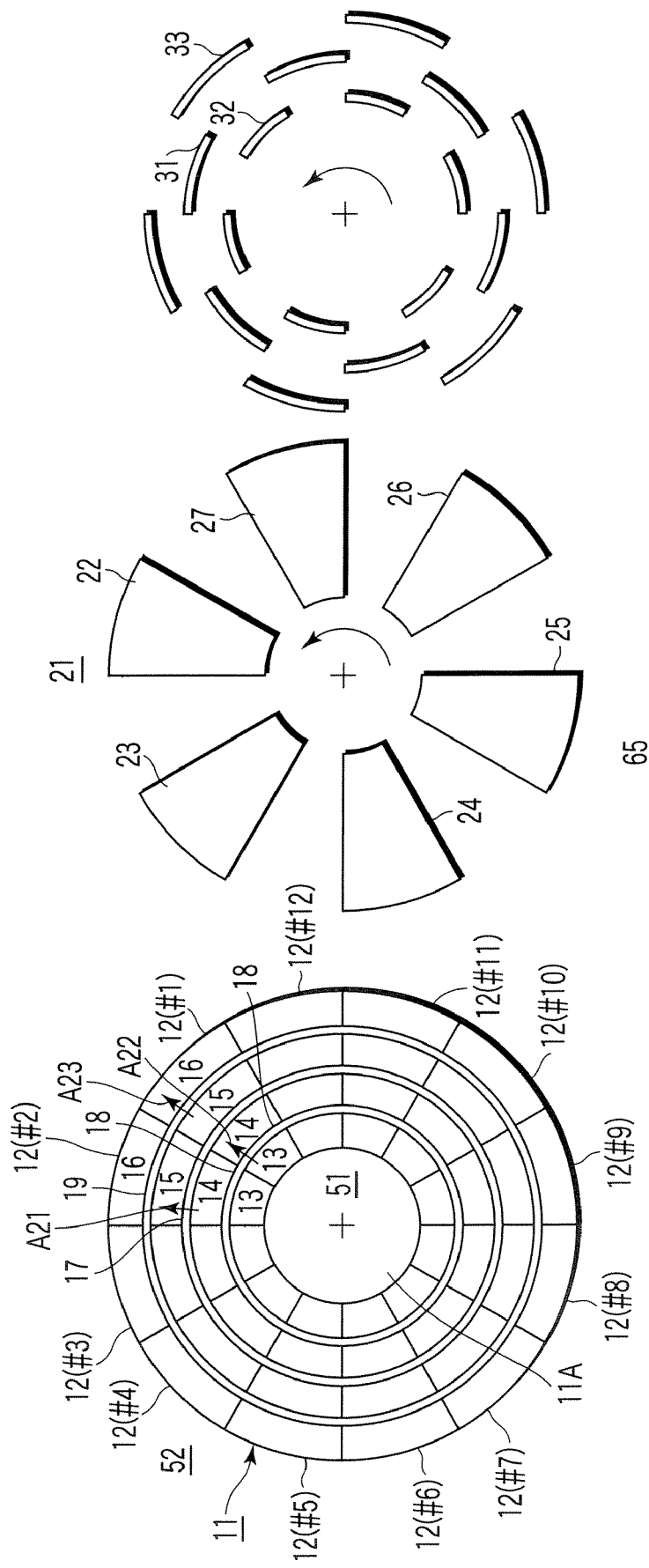

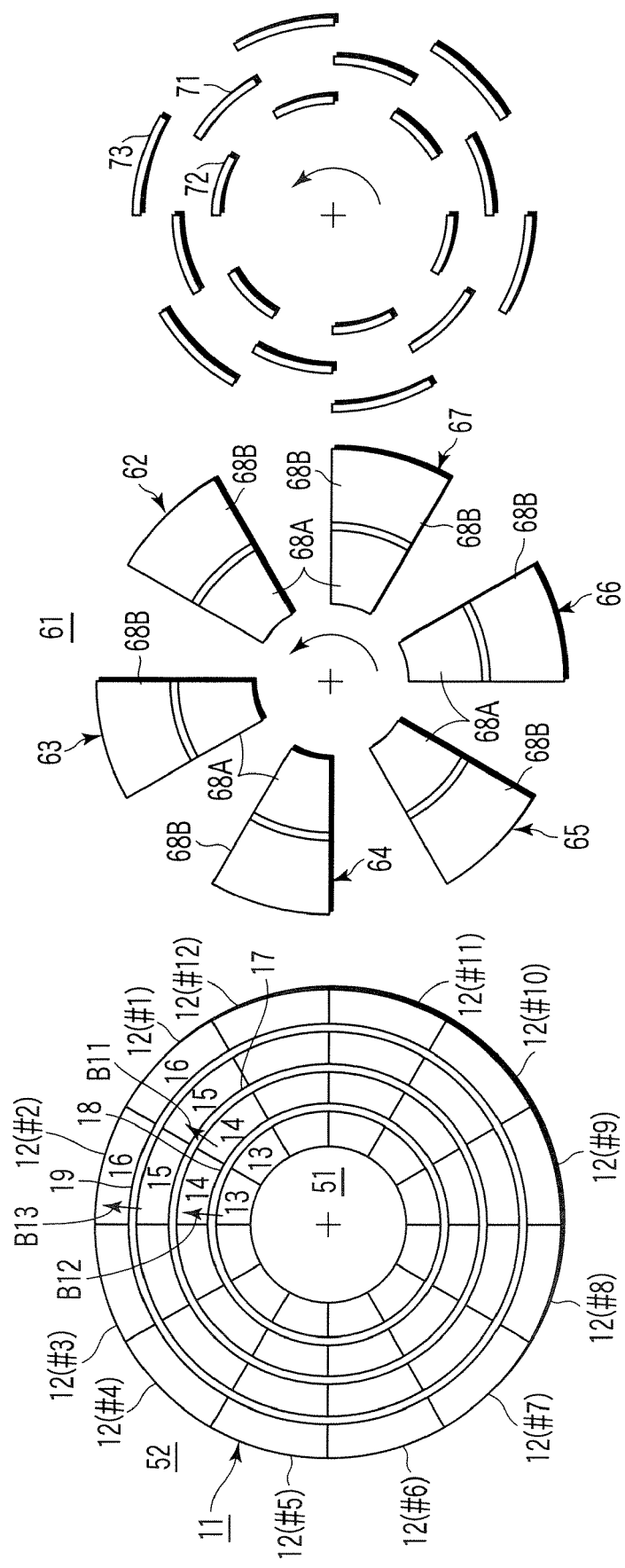

MAGNETIC REFRIGERATOR

CROSS-REFERENCE TO RELATED APPLICATIONS

This application is based upon and claims the benefit of priority from prior Japanese Patent Application No. 2005-345465, filed Nov. 30, 2005, the entire contents of which are incorporated herein by reference.

BACKGROUND OF THE INVENTION

1. Field of the Invention

The present invention relates to a magnetic refrigerator that transmits heat by solid thermal conduction.

2. Description of the Related Art

Certain magnetic segments are known to exhibit significant temperature changes during magnetization or demagnetization. That is to say, changing an applied field in a heat insulation state changes the temperature of a magnetic material segment. This phenomenon is called a magnetic heat quantity effect. In a physical sense, the degree of freedom of magnetic spins inside the magnetic material segment is changed by the magnetic field. This in turn changes the entropy of a magnetic spin system (electron system responsible for magnetism). The entropy change instantaneously transfers energy between the electron system and a lattice system. This changes the temperature of the magnetic material segment. Magnetic refrigeration utilizes the magnetic heat quantity effect to perform refrigerating operations.

A gas compressing cycle is used for most refrigerating techniques in an ordinary temperature zone closely related to human daily lives, for example, refrigerators, freezers, and interior cooling. However, the refrigerating technique based on the gas compressing cycle has the significant disadvantage of emitting a particular chlorofluorocarbon gas to an environment to destroy an ozone layer. A hydrochlorofluorocarbon gas may also affect the environment in connection with global warming. Under these circumstances, a clean and efficient refrigerating technique has been desired to be put to practical use; such a refrigerating technique needs to avoid environmental destruction associated with the disposal of operating gas.

In recent years, magnetic refrigeration has been expected as an environment-oriented and efficient refrigerating technique. Much effort has been made to research and develop magnetic refrigerating techniques for the ordinary temperature zone.

As a useful refrigerating scheme for magnetic refrigeration in the ordinary temperature zone, Barclay in U.S. has proposed an AMR scheme (Active-Magnetic Regenerative Refrigeration) such as the one disclosed in, for example, U.S. Pat. No. 4,332,135. This method has been developed in view of the problem that "in a high temperature zone such as the room temperature, the lattice entropy of thermal disturbance increases relative to the entropy of a magnetic spin system, reducing a change in the temperature of a magnetic material segment caused by the magnetic heat quantity effect". This method rather actively utilizes the lattice entropy considered to be an inhibiting factor for the magnetic refrigeration in this temperature zone. Specifically, this refrigeration scheme allows the magnetic material segment to perform a magnetic refrigerating operation based on the magnetic heat quantity effect and to exert a thermal storage effect to store cooling heat generated as a result of the magnetic refrigerating operation.

The AMR scheme is characterized by controlling heat transfer to and from the magnetic refrigerating material so as to combine the magnetic refrigerating operation based on the magnetic heat quantity effect with the thermal storage effect to form an advantageous temperature gradient over the entire magnetic refrigerating material. A specific method involves, for example, dividing a solid magnetic refrigerating material into small pieces and arranging the pieces so as to suppress the direct heat transfer among the pieces. Then, cooling heat generated by the magnetic heat quantity effect of each small piece is transferred from the small piece to a heat transporting medium (liquid or gas) by heat exchange. The heat transporting medium is allowed to flow to transport the cooling heat generated. This transportation requires a channel for the heat transporting medium as well as sufficient heat exchange between the magnetic refrigerating material and the heat transporting medium. The magnetic refrigerating material thus needs to be shaped so as to have a large specific surface area and to provide a channel for the heat transporting medium. The actual shape may be a honeycomb structure obtained by forming a material into a thin plate and folding the thin plate into bellows, laminated meshes, or spherical particles filled into a container.

Zimm Gschneidner Pecharsky et al. in U.S. has actually made an experimental AMR-based magnetic refrigerator using a superconductive magnet, to successfully execute a continuous and steady magnetic refrigerating cycle in the room temperature zone (1997). The AMR-based magnetic refrigerator uses Gd (gadolinium) as a magnetic refrigerating material. Gd (gadolinium) is formed into fine spheres of diameter about 0.3 mm, which are then filled into a magnetic refrigeration working chamber. With this magnetic refrigerator, Gd spherical particles, a magnetic refrigerating material, contact one another at points. This sharply reduces the heat transfer among the spherical particles. On the other hand, in the magnetic refrigerator, an inlet and outlet for the heat transporting refrigerant are connected to the respective ends of the magnetic refrigeration working chamber to provide a structure that allows the heat transporting refrigerant to be guided into and out of the working chamber. The heat transporting medium is water or a mixed solution of water and ethanol. A coil-like superconductive magnet is provided outside the magnetic refrigeration working chamber. The magnetic refrigeration working chamber is movable. The magnitude of a magnetic field applied to the magnetic refrigerating material can be changed by displacing the magnetic refrigeration working chamber from a bore space in the coil along the axis of the superconductive coil; the magnetic refrigerating material is housed inside the magnetic refrigeration working chamber. Here, AMR is executed in steps described below. First, (A) the magnetic refrigeration working chamber is moved to the bore space in the superconductive magnet, and a magnetic field is applied to the magnetic refrigerating material. (B) The heat transporting refrigerant is then moved (allowed to flow) from one end to the other end of the magnetic refrigeration working chamber to transport heat. (C) The magnetic refrigeration working chamber is then moved from the bore space in the superconductive magnetic to the outside, and the magnetic field applied to the magnetic refrigerating material is removed. (D) The heat transporting refrigerant is then moved (allowed to flow) from one end to the other end of the magnetic refrigeration working chamber (direction opposite to that for the refrigerant movement in B) to transport heat. Repetition of the thermal cycle steps (A) to (D) raises the temperature of the magnetic refrigerating material particles inside the magnetic refrigeration working chamber in association with the application of the magnetic field.

Then, heat is exchanged between the particles and the heat transporting refrigerant, which then moves forward. Heat is then exchanged between the heat transporting refrigerant and the particles. The subsequent removal of the magnetic field lowers the temperature of the magnetic refrigerating material particles. Heat is then exchanged between the particles and the heat transporting medium, which then moves backward. Heat is then exchanged between the heat transporting refrigerant and the particles. That is to say, the heat transfer between the spherical particles, a magnetic refrigerating material, is predominated by indirect heat conduction via the heat transporting refrigerant. Direct heat conduction based on the contact between the spherical particles is suppressed. Each spherical particle stores heat owing to a high thermal storage effect. Thus, repetition of the heat cycle varies the temperatures of the adjacent spherical particles, resulting in a temperature gradient in the direction of a heat flow of the heat transporting medium. This makes it possible to make a great difference between the temperatures at the opposite ends of the magnetic refrigeration working chamber in a steady state.

In the example of the magnetic refrigerator proposed by Zimm et al., a superconductive magnet was used to change the magnetic field from 0 to 5 Tesla in the room temperature zone to successfully achieve refrigeration with a refrigerating temperature difference $\Delta T$=about 30° C. between the opposite ends of the magnetic refrigeration working chamber. It has also been reported that a refrigerating temperature difference $\Delta T$ of 13° C. lead to a very high refrigerating efficiency (COP=15; excluding power input to a magnetic field generating unit). Domestic refrigerators based on a conventional compression cycle with chlorofluorocarbon have a refrigerating efficiency (COP) of about 1 to 3.

However, the AMR-based magnetic refrigerator disclosed in U.S. Pat. No. 4,332,135 uses a superconductive magnet to apply a magnetic field of about 2 to 5 Tesla to a magnetic refrigeration operating substance as described above. Thus, the superconductive magnetic requires a cryogenic environment at about 10 k. However, such a cryogenic environment requires a freezing mixture such as liquid helium, or a cryogenic refrigerator. This complicates the magnetic refrigerating system and increases its size and cost. Instead of the superconductive magnetic, an electromagnet may be utilized as a unit that generates a magnetic field. However, even the electromagnet requires a large current to be input in order to generate a large magnetic field of about 1 Tesla. This makes the system complicated and inconvenient, for example, requires water cooling in order to reduce Joule heat. Further, running costs rise and the size of the system increases as is the case with the superconductive magnet. The system thus becomes expensive.

On the other hand, the above embodiment of the AMR scheme forms a magnetic refrigerating material into spherical particles and fills a container with the particles. The embodiment uses a mixed solution of water and ethanol as a heat transporting medium. That is to say, the transportation of cooling heat does not depend on the direct heat conduction between solids but on the heat exchange between a solid and a fluid (in this case, a liquid) followed by fluid movement. Thus, not only a solid but also a fluid such as a liquid or gas is required as magnetic refrigerating materials for a magnetic refrigerating operation. Moreover, a driving mechanism is required to move the fluid. This economically disadvantageously increases the scale of the system.

BRIEF SUMMARY OF THE INVENTION

According to an aspect of the present invention, there is provided a magnetic refrigerator comprising:
a generating unit which generates a magnetic field increased and reduced alternately;
a magnetic block including positive and negative magnetic segments which are alternately arranged with gaps between the positive and negative magnetic segments and to which the magnetic field is applied, the positive magnetic segments producing heat depending on the increasing of the magnetic field and absorbing heat depending on the decreasing of the magnetic field, and the negative magnetic segments producing heat depending on the decreasing of the magnetic field and absorbing heat depending on the increasing of the magnetic field; and
a heat conducting unit configured to conduct heat between the positive and negative magnetic segments, which includes a conducting member which is inserted into the gap and removed from the gap, alternately, in accordance with the increasing or decreasing of the magnetic field, the positive and negative magnetic segments and the conducting member forming a heat conducting path in the magnetic block.

According to another aspect of the present invention, there is provided a magnetic refrigerator comprising:
a generating unit which generates a magnetic field increased and reduced, alternately;
a magnetic unit having a circumferential direction and a radial direction, which includes magnetic blocks arranged in a circumferential direction, each of the magnetic blocks including an arrangement of positive and negative magnetic segments which are alternately arranged in the radial direction with gaps between the positive and negative magnetic segments and to which the magnetic field is applied, the positive magnetic segments producing heat depending on the increasing of the magnetic field and absorbing heat depending on the decreasing of the magnetic field, and the negative magnetic segments producing heat depending on the decreasing of the magnetic field and absorbing heat depending on the increasing of the magnetic field; and
a heat conducting unit configured to conduct heat between the positive and negative magnetic segments, which includes conducting members each of which is inserted into the corresponding gap and removed from the corresponding gap, alternately, in accordance with the increasing or decreasing of the magnetic field, the positive and negative magnetic segments and the conducting member forming a heat conducting path in the magnetic block.

According to yet another aspect of the present invention, there is provided a magnetic refrigerator comprising:
a permanent magnet unit including permanent magnets, the permanent magnets being so separately arranged along a circumferential direction as to form a substantially hub shape and have a first inner and outer diameters in a radial direction;
a rotating unit having a rotating shaft which supports the permanent magnet unit, configured to rotate the permanent magnet unit with the rotating shaft to produce a rotating magnetic field which is alternately increased and reduced depending on the rotation of the permanent magnet along the circumferential direction;
a magnetic unit substantially formed into a hollow disk shape having a hollow space and a second inner and outer diameters which are substantially equal to the first inner and outer diameters, the magnetic unit including magnetic blocks arranged in the circumferential direction and concentric with the permanent magnet unit, every two of the magnetic blocks corresponding to each of the permanent magnets, each of the magnetic blocks including an arrangement of positive and negative magnetic segments which are alternately arranged in the radial direction with gaps between the positive and negative magnetic segments, the positive magnetic segments producing heat depending on the increasing of the magnetic field and absorbing heat depending on the decreasing of the magnetic field, and the negative magnetic segments producing heat depending on the decreasing of the magnetic field and absorbing heat depending on the increasing of the magnetic field; and a heat conducting unit including conducting members, which inserts the conducting members into the gaps and removes the conducting members from the gaps, alternatively, in accordance with the rotation of the permanent magnet so that the conducting member conducts heat produced in the magnetic segments along a predetermined heat conducting path.

BRIEF DESCRIPTION OF THE SEVERAL VIEWS OF THE DRAWING

FIGS. 3A to 3C are plan views showing a magnetic unit, a permanent magnetic section, and heat exchanger plates, respectively, which are used in the magnetic refrigerator shown in FIGS. 1A and 1B;

FIGS. 7A to 7C are plan views showing a magnetic unit, a permanent magnetic section, and heat exchanger plates, respectively, which are used in a magnetic refrigerator according to a second embodiment.

DETAILED DESCRIPTION OF THE INVENTION

With reference to the drawings, description will be given of magnetic refrigerators according to embodiments.

First Embodiment

Figure 1A:
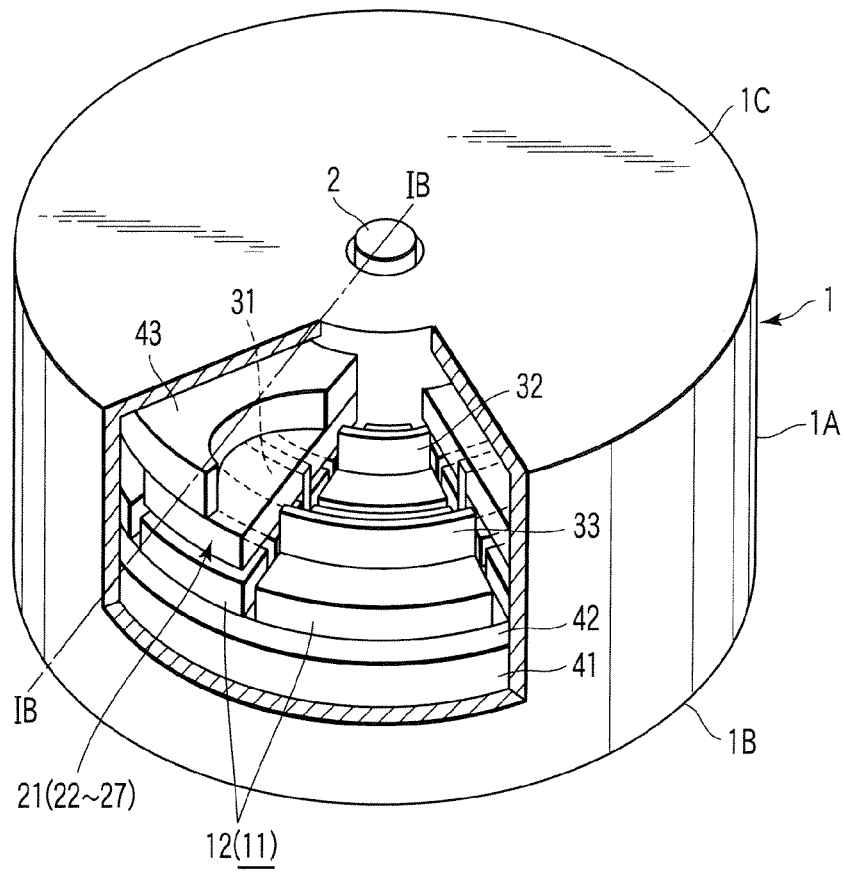
FIGS. 1A and 1B are a partly exploded perspective view and a partial sectional view schematically showing a magnetic refrigerator according to a first embodiment.
Figure 1B:
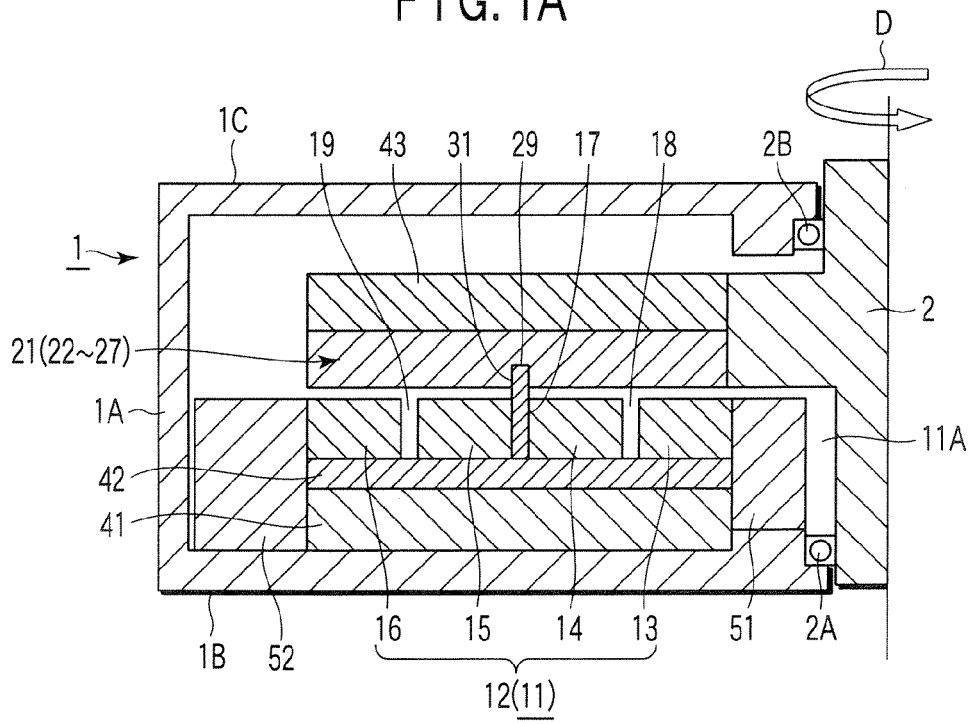

FIG. 1A is a partly exploded perspective view schematically showing a magnetic refrigerator according to a first embodiment. FIG. 1B is a sectional view taken along line IB-IB in FIG. 1A.

In FIG. 1A, reference numeral denotes a casing of the magnetic refrigerator which is composed of a cylindrical body 1A formed like a hollow cylinder having a bottom surface 1B at the bottom and a top cover 1C at the top. A rotating shaft 2 is placed along the center axis of the casing 1 in a vertical direction and constitutes a driving unit. The rotating shaft 2 is rotatably supported by bearings 2A and 2B provided on the bottom surface 1B and top cover 1C, respectively. The rotating shaft 2 is connected to a rotating shaft of a motor (not shown) and rotated at a predetermined speed.

Figures 2A, 2B, 2C:
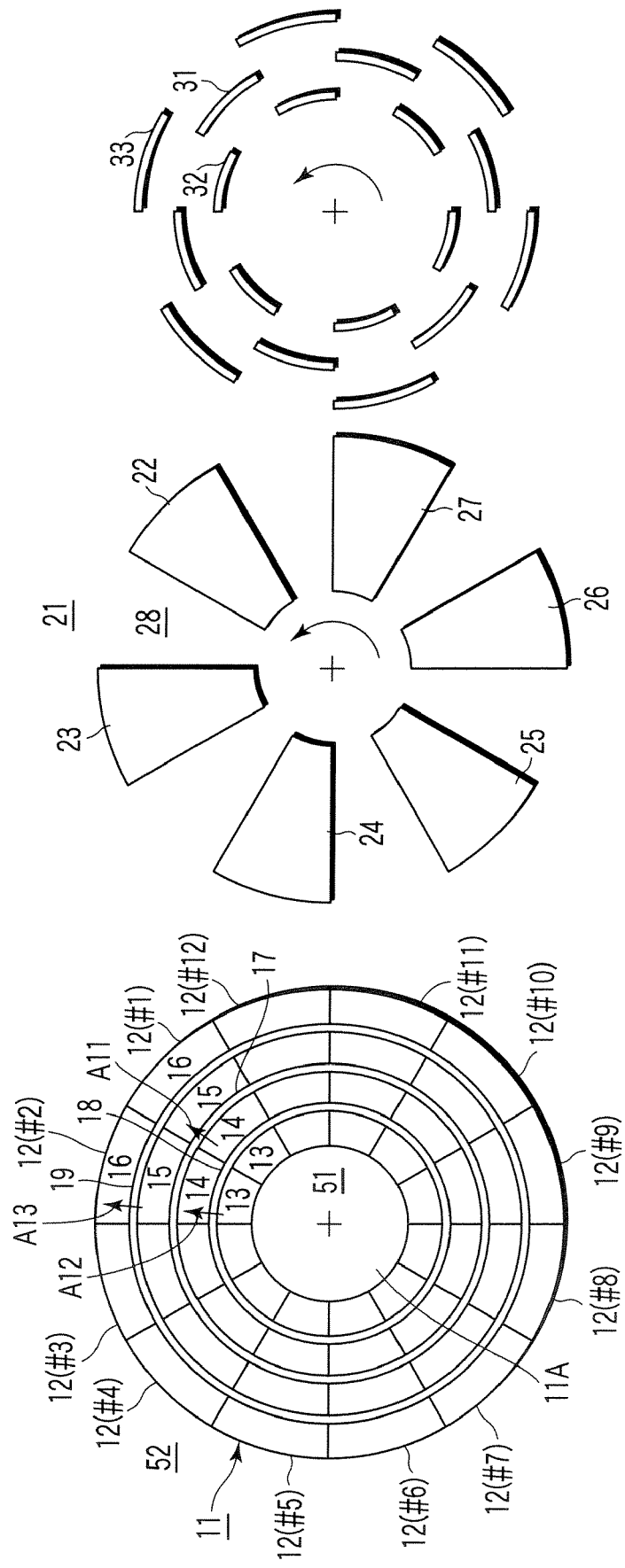
FIGS. 2A to 2C are plan views showing a magnetic unit, a permanent magnetic section, and heat exchanger plates, respectively, which are used in the magnetic refrigerator shown in FIGS. 1A and 1B.

Inside the casing 1, a first yoke 41 is placed on the inner bottom surface 1B of the cylindrical body as shown in FIG. 2B. A magnetic unit 11 is placed on the first yoke 41 via a heat insulating material 42. The magnetic unit 11 is annularly formed so as to centrally have a cylindrical hollow portion 11A in which the rotating shaft 2 is placed. The magnetic unit 11 will be described below in detail. The first yoke 41 and heat insulating material 42 are formed like hollow disks arranged concentrically with the magnetic unit 11 and each having inner and outer diameters almost equal to those of the magnetic unit 11.

A permanent magnet unit 21 is placed opposite the magnetic unit 11 to apply a magnetic field to the magnetic unit 11. The permanent magnet unit 21 has one surface facing the magnetic unit 11 and an opposite surface on which a second yoke 43 is placed. The permanent magnet unit 21 is formed like a hub placed concentrically with the magnetic unit 11 and having inner and outer diameters almost equal to those of the magnetic unit 11. The permanent magnet 21 will also be described below in detail. The second yoke 43 is similarly formed like a hub placed concentrically with the magnetic unit 11 and having an outer diameter almost equal to that of the magnetic unit 11.

The second yoke 43 has an inner circumference face fixed to the rotating shaft 2 and is rotated together with the rotating shaft 2. Rotating the rotating shaft 2 in the direction of arrow D rotates the permanent magnet unit 21 opposite the magnetic unit 11 together with the second yoke 43. Consequently, the permanent magnet unit 21 applies a magnetic field to the magnetic unit 11 with the magnitude of the magnetic field increased or reduced.

Heat exchanger plates or heat conducting plates 31, 32, and 33 are provided on the permanent magnet unit 21 and the second yoke 43. The heat exchanger plate 31 projects from permanent magnets 22 to 27 of the permanent magnet unit 21. The heat exchanger plates 32 and 33 project from the second yoke 43. The heat exchanger plates 31, 32, and 33 will also be described below in detail.

Inside the casing 1, a lower-temperature heat exchanger 51 such as a cooler for absorbing heat to cool a space or target object is placed in the cylindrical hollow portion 11A of the magnetic unit 11 as a lower-temperature heat exchanging unit. A higher-temperature heat exchanger 52 such as a radiator for dissipating heat is placed around the outer periphery of the magnetic unit 11 as a higher-temperature heat exchanging unit. The lower-temperature heat exchanger 51 and higher-temperature heat exchanger 52 are thermally connected to the magnetic unit 11.

FIGS. 2A to 2C are plan views of the magnetic unit 11, permanent magnet unit 21, and heat exchanger plates 31, 32, and 33, respectively. FIGS. 3A, 3B, and 3C are also plan views of the magnetic unit 11, permanent magnet unit 21, and heat exchanger plates 31, 32, and 33, respectively.

As shown in FIGS. 2A and 3A, the magnetic unit 11 is annularly formed so as to centrally have the cylindrical hollow portion 11A. The magnetic unit 11 is composed of a plurality of, in the example shown in FIGS. 2A and 3A, 12 magnetic blocks 12 (#1 to #12) jointly arranged along a circumferential direction. Each of the magnetic blocks 12 is composed of a plurality of, in the example shown in FIGS. 2A and 3A, four magnetic segments 13 to 16 concentrically arranged via predetermined gaps 17 to 19 in a radial direction.

The magnetic segments 13 to 16 are grouped into negative and positive types. The negative type of the magnetic segments 13 and 15 have a negative characteristic in which a temperature of the negative type magnetic segments 13 and 15 is lowered, when a magnetic field is applied to the negative type magnetic segments 13 and 15 to absorb heat from an space or a target object outside of the negative type magnetic segments 13 and 15, and the temperature of the negative type magnetic segments 13 and 15 is raised, when a magnetic field is removed from the negative type magnetic segments 13 and 15 to produce heat in the negative type magnetic segments 13 and 15. The positive type of the magnetic segments 14 and 16 have a positive characteristic in which a temperature of the positive type magnetic segments 14 and 16 is raised, when a magnetic field is applied to the positive type magnetic segments 14 and 16 to produce heat in the positive type magnetic segments 14 and 16, and the temperature of the negative type magnetic segments 13 is lowered, when a magnetic field is removed from the negative type magnetic segments 13 and 15 to absorb heat from the space or the target object outside of the negative type magnetic segments 13 and 15. The magnetic segments 14 and 16 with the positive characteristic are alternately arranged between the magnetic segments 13 and 15 with the negative characteristic. In the magnetic unit 11 having a plurality of the magnetic blocks 12 arranged in the circumferential direction, the magnetic segments 13 to 16 in each magnetic block 12 are arranged in such a manner that the adjacent magnetic segments 13 to 16 in the radial direction exhibit the same polarity.

Here, the magnetic segments 14 and 16 with the positive characteristic are composed of what is called a ferromagnetic or meta-magnetic substance (which exhibits an order-disorder transition from a ferromagnetic state to a paramagnetic state in response to application and removal of a magnetic field); the magnetic segments 14 and 16 are in a paramagnetic state (magnetic spins are disordered) with no magnetic field applied to the segments and is brought to a ferromagnetic state (magnetic spins are ordered) when a magnetic field is applied to the segments. Specific examples of the positive magnetic material segment include ferromagnetic substances such as Gd and Gd-based alloys, that is, Gd—Y, Gd—Dy, Gd—Er, and Gd—Ho alloys, and meta-magnetic substances and ferromagnetic substances based on La(Fe, Si) 13 or La(Fe, Al) 13.

The magnetic segments 13 and 15 with the negative characteristic are composed of a substance which exhibits different ordered states depending on whether a magnetic field is applied to the segments and which exhibits an order-order transition between the two ordered states in response to application and removal of a magnetic field; the degree of order is higher (the degree of freedom of the system is lower) when the magnetic field has been removed from the segments. Examples of the negative magnetic material segment include substances such as FeRH alloy which exhibit an order-order transition from the ferromagnetic state to an anti-ferromagnetic state in response to application and removal of a magnetic field. With the FeRh alloy, the magnitude of magnetic moment of Rh changes significantly between the two states owing to a difference in the polarization of Rh. This changes the entropy of an electron system.

The magnetic unit 11 is placed on the first yoke 41 via the heat insulating member 42 as shown in FIG. 1B. The heat insulating member 42 prevents heat generated by the magnetic unit 11 from being transmitted to the first yoke 41.

FIGS. 2B and 3B show the planar arrangement of the permanent magnet unit 21 placed opposite the magnetic unit 11. The second yoke 43 is provided on the surface of permanent magnet unit 21 which is opposite its surface lying opposite the magnetic unit 11 as shown in FIG. 1B.

The permanent magnet unit 21 has a plurality of, in the example shown in FIGS. 2B and 3B, six fan-shaped permanent magnets 22 to 27 having the same size and shape as those of the magnetic blocks 12. The permanent magnets 22 to 27 are circumferentially arranged at intervals. The arrangement of the permanent magnets 22 to 27 and the spaces 28 among the permanent magnets 22 to 27 corresponds to the arrangement of the plurality of magnetic blocks 12 constituting the magnetic unit 11. The thus arranged permanent magnet unit 21 are formed like a hub which is generally concentric with the magnetic unit 11 and which has an inner and outer diameters almost equal to those of the magnetic unit 11. The permanent magnet unit 21 is also rotatable with the second yoke 43. This rotation constitutes a magnetic field increasing and reducing unit that increases and reduces the magnitude of a magnetic field for each magnetic block 12. In this case, the second yoke 43, which supports the permanent magnet unit 21, is fixed to the rotating shaft 2 as described with reference to FIG. 1A. Rotation of the rotating shaft 2 rotates the second yoke 43 at a predetermined speed together with the permanent magnet unit 21.

The permanent magnets 22 to 27 are thus shaped to generally cover the top surface of the magnetic segments 13 to 16 of the corresponding magnetic block 12. Each of the permanent magnets 22 to 27 is placed for every two magnetic blocks 12. As the permanent magnet unit 21 rotates, a magnetic field is alternately applied to and removed from each magnetic block 12. In the magnetic refrigerator shown in FIGS. 2A and 2B or 3A and 3B, the 12 magnetic blocks 12 are arranged along the circumference of the magnetic unit 11. The six permanent magnets 22 to 27 constitute the hub-shaped permanent magnet unit 21.

FIGS. 2C and 3C show the heat exchanger plates 31, 32, and 33, arranged concentrically with the magnetic unit 11. The heat exchanger plates 31, 32, and 33 are preferably composed of a high-heat-conductivity material with excellent heat conduction, for example, copper or aluminum. The heat exchanger plates 31, 32, and 33 are arranged in the radial and circumferential directions of the magnetic unit 11. The heat exchanger plates 31, 32, and 33 rotate integrally with the permanent magnet unit 21 and yoke 43 so as to pass through gaps 17, 18, and 19.

The heat exchanger plates 31, shown in FIGS. 2C and 3C, project from the permanent magnets 22 to 27 of the permanent magnet unit 21. Specifically, the heat exchanger plates 31 are fixed to the permanent magnets 22 to 27 by fitting proximal ends of the heat exchanger plates 31 into fitting grooves 29 in the permanent magnets 22 to 27 of the permanent magnet unit 21 as shown in FIG. 1B. The heat exchanger plates 32 and 33 project from the second yoke 43, which lies opposite the spaces 28 among the permanent magnets 22 to 27, shown in FIGS. 2B and 3B. Similarly to the heat exchanger plates 31, the heat exchanger plates 32 and 33 are fixedly attached to the second yoke 43 by fitting proximal ends of the heat exchanger plates 32 and 33 into fitting grooves (not shown) in the second yoke 43.

The heat exchanger plates 31, 32, and 33 are arranged so as to pass through the gaps 17 to 19, formed circumferentially among the magnetic segments 13 to 16, constituting the magnetic block 12. In this case, the heat exchanger plates 31 pass through the gap 17 between the magnetic segments 14 and 15. The heat exchanger plates 32 pass through the gap 18 between the magnetic segments 13 and 14. The heat exchanger plates 33 pass through the gap 19 between the magnetic segments 15 and 16. In the gaps 17 to 19, the heat exchanger plates 31, 32, and 33 have arc lengths that are almost equal to the lengths of the corresponding magnetic segments 13 to 16.

This arrangement may be provided with a supply function for supplying heat conducting grease or lubricant to the gaps 17, 18, and 19. The supply function may then supply thermal conducting grease or lubricant to the gaps 17, 18, and 19. With the structure in which the gaps 17, 18, and 19 are filled with thermal conducting grease or lubricant, the heat exchanger plates 31, 32, and 33 and magnetic segments 13 to 16 can be inhibited from being worn. This structure further enables a reduction in the contact thermal resistance between the heat exchanger plates 31, 32, and 33 and the magnetic segments 13 to 16. This in turn further improves the heat conduction between the heat exchanger plates 31, 32, and 33 and the magnetic segments 13 to 16.

Figure 4:
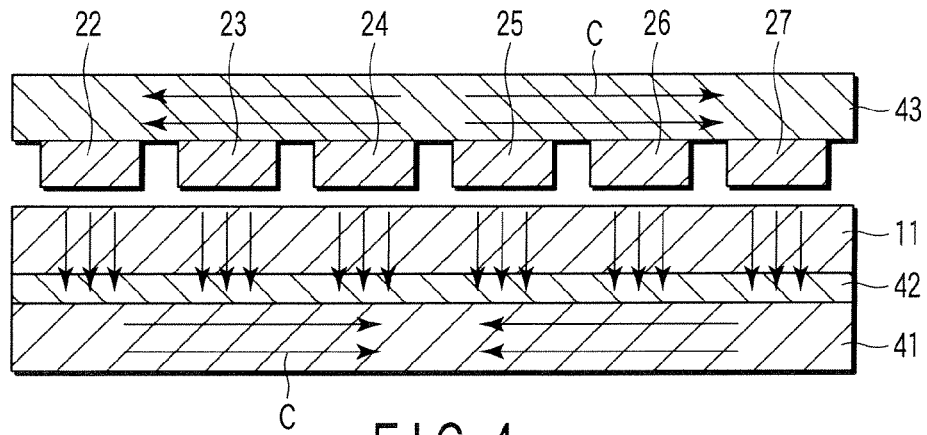
FIG. 4 is a development schematically showing a cross section of the magnetic refrigerator shown in FIGS. 1A and 1B.

FIG. 4 illustrates the positional relationship among the magnetic unit 11 and the permanent magnet unit 21 and the yokes 41 and 43 in further detail. FIG. 4 is a development of the sectional view shown in FIG. 1B and schematically shows the structure of the magnetic refrigerator.

In this magnetic refrigerator, the permanent magnet unit 21 is placed opposite the magnetic unit 11 and is shaped like a hub which is concentric with the magnetic unit 11 and which has inner and outer diameters almost equal to those of the magnetic unit 11. The surface of the permanent magnet unit 21 which is opposite its surface lying opposite the magnetic unit 11 is supported on the second yoke 43. The second yoke 43 is also formed like a disk which is concentric with the magnetic unit 11 and which has an outer diameter almost equal to that of the magnetic unit 11. The magnetic unit 11 is supported the by the yoke 41 via the heat insulating member 42, provided on the surface of the magnetic material segment 11 which is opposite its surface lying opposite the permanent magnet unit 21. The heat insulating material 42 and yoke 41 are also shaped to be concentric with the magnetic unit 11 and to have an inner and outer diameters almost equal to those of the magnetic unit 11. Magnetic lines of force C generated by the permanent magnets 22 to 27 of the permanent magnet unit 21 are transmitted through a closed magnetic circuit consisting of the magnetic unit 11 and yokes 41 and 43.

Now, description will be given of operation of the magnetic refrigerator configured as shown in FIGS. 1A to 4.

In the magnetic refrigerator configured as shown in FIGS. 1A to 4, the magnetic unit 11, permanent magnet unit 21, and heat exchanger plates 31, 32, and 33 are concentrically arranged. The magnetic unit 11 is fixed. The permanent magnet unit 21 and heat exchanger plates 31, 32, and 33 are integrally rotated.

Figure 5A:
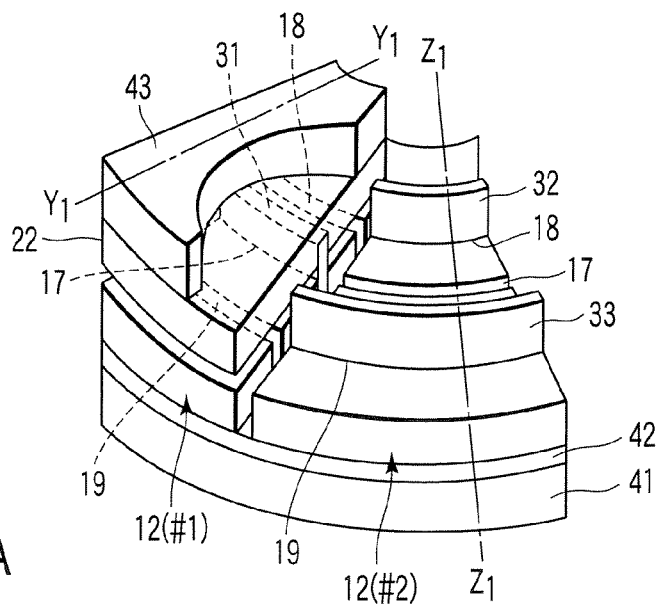
FIGS. 5A, 5B, and 5C are a partial perspective view and partial sectional views schematically showing a part of internal structure of the magnetic refrigerator shown in FIGS. 1A and 1B.
Figure 5B:
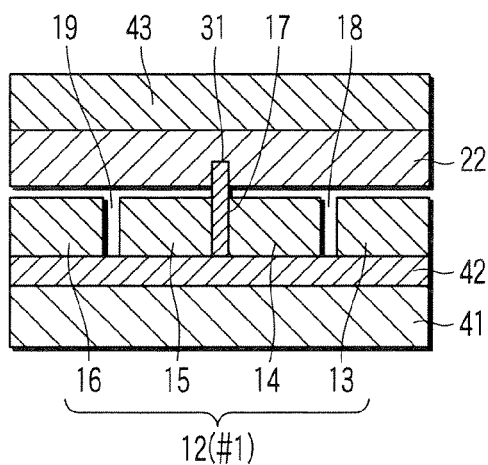
Figure 5C:
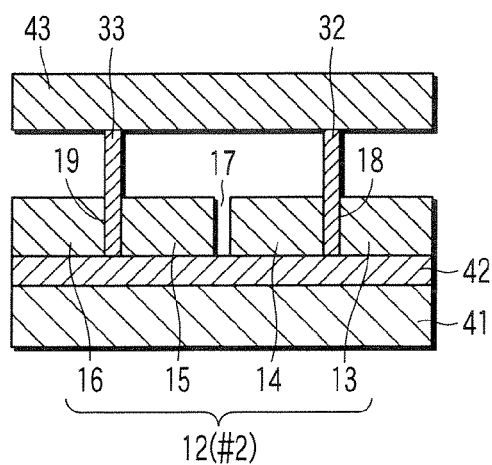

At a certain moment, the magnetic unit 11, permanent magnet unit 21, and heat exchanger plates 31, 32, and 33 are arranged so as to have such a positional relationship as shown in FIGS. 2A to 2C. This arrangement is shown in FIGS. 5A, 5B, and 5C. FIG. 5A three-dimensionally shows a part of the refrigerator. FIGS. 5B and 5C show cross sections taken along lines Y1-Y1 and Z1-Z1, respectively, in FIG. 5A. In this arrangement, the permanent magnet 22 in the permanent magnet unit 21 is placed opposite the magnetic block 12 shown as #1. The heat exchanger plate 31 is positioned in the gap 17 between the magnetic segments 14 and 15 in the magnetic block 12 shown as #1. The heat exchanger plates 32 and 33 are positioned in the gap 18 between the magnetic segments 13 and 14 and in the gap 19 between the magnetic segments 15 and 16, in the magnetic block 12 shown as #2.

Likewise, the permanent magnets 23 to 27 in the permanent magnet unit 21 are arranged opposite the magnetic blocks 12 shown as #3, #5, #7, #9, and #11, respectively. The heat exchanger plate 31 is positioned in the gap 17 between the magnetic segments 14 and 15 in each of the magnetic blocks 12 shown as #3, #5, #7, #9, and #11. The heat exchanger plates 32 and 33 are positioned in the gap 18 between the magnetic segments 13 and 14 and in the gap 19 between the magnetic segments 15 and 16, in each of the magnetic block 12 shown as #2, #4, #6, #8, #10, and #12.

In this state, each of the permanent magnets 22 to 27 of the permanent magnet unit 21 applies a magnetic field to the magnetic block 12 located opposite this permanent magnet. This lowers the temperature of the magnetic segments 13 and 15 with the negative characteristic, while raising the temperature of the magnetic segments 14 and 16 with the positive characteristic. On this occasion, the heat exchanger plate 31 is positioned so as to fill the gap 17 between the magnetic segments 14 and 15. This enables heat conduction-based heat transportation in the direction of arrow A11 in FIG. 2 from the magnetic segment 14 with the raised temperature to the magnetic segment 15 with the lowered temperature. Under these conditions, in the same magnetic block 12, temperature gradients are also created between the magnetic segments 13 and 14 and between the magnetic segments 15 and 16. However, no heat exchanger plates are present but air layers are formed, in the gaps 18 and 19. Consequently, the heat insulating effect of the air layers significantly reduces the heat transportation based on heat conduction.

On the other hand, the magnetic field has been removed from the magnetic blocks 12 shown as #2, #4, #6, #8, #10, and #12. This raises the temperature of the magnetic segments 13 and 15 with the negative characteristic, while lowering the temperature of the magnetic segments 14 and 16 with the positive characteristic. On this occasion, the heat exchanger plate 32 is positioned so as to fill the gap 18 between the magnetic segments 13 and 14. This enables heat conduction-based heat transportation in the direction of arrow A12 in FIG. 2 from the magnetic segment 13 with the raised temperature to the magnetic segment 14 with the lowered temperature. At the same time, the heat exchanger plate 33 is positioned so as to fill the gap 19 between the magnetic segments 15 and 16. This enables heat conduction-based heat transportation in the direction of arrow A13 in FIG. 2 from the magnetic segment 15 with the raised temperature to the magnetic segment 16 with the lowered temperature. In this case, in the same magnetic block 12, a temperature gradient is also created between the magnetic segments 14 and 15. However, no heat exchanger plate is present but an air layer is formed, in the gap 17. Consequently, the heat insulating effect of the air layer significantly reduces the heat transportation based on heat conduction.

Thus, when the positional relationship among the magnetic unit 11 and permanent magnet unit 21 and heat exchanger plates 31, 32, and 33 is as shown in FIGS. 2A to 2C, heat is transported in the directions shown by arrows A11, A12, and A13 in FIG. 2A, that is, from the inner to outer diameter of the magnetic unit 11.

Figure 6A:
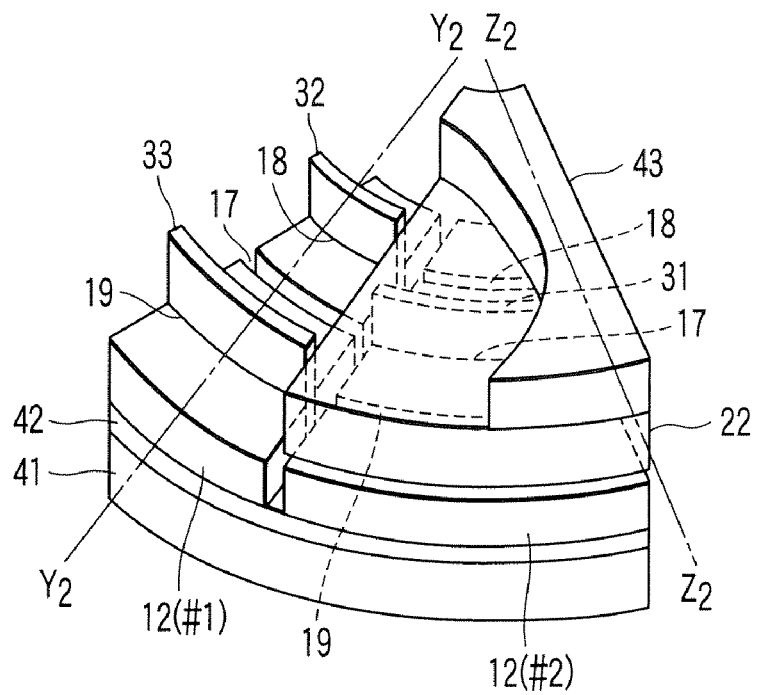
FIGS. 6A, 6B, and 6C are a partial perspective view and partial sectional views schematically showing a part of internal structure of the magnetic refrigerator shown in FIGS. 1A and 1B.
Figure 6B:
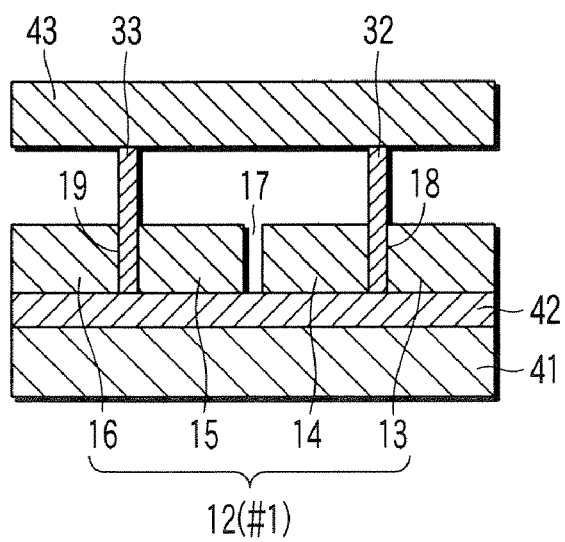
Figure 6C:
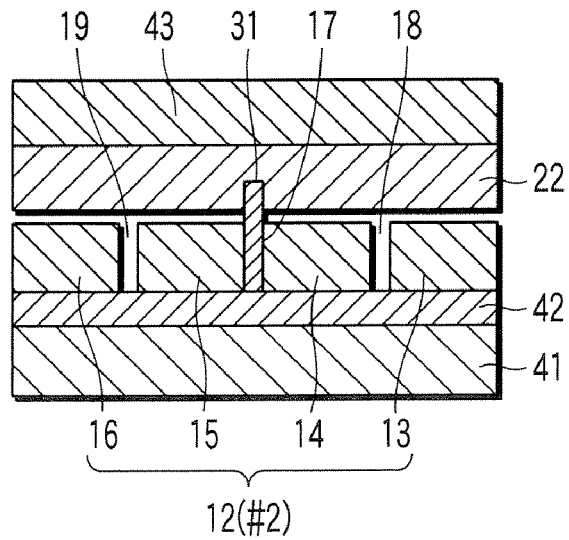

Then, the permanent magnet unit 21 and heat exchanger plates 31, 32, and 33 further rotate relative to the magnetic unit 11. At a certain time, the magnetic unit 11, permanent magnet unit 21, and heat exchanger plates 31, 32, and 33 are arranged so as to have such a positional relationship as shown in FIGS. 3A to 3C. This arrangement is shown in FIGS. 6A, 6B, and 6C. FIG. 6A three-dimensionally shows a part of the refrigerator. FIGS. 6B and 6C show cross sections taken along lines Y2-Y2 and Z2-Z2, respectively, in FIG. 6A. In this arrangement, the permanent magnet 22 in the permanent magnet unit 21 is placed opposite the magnetic block 12 shown as #2. The heat exchanger plate 31 is positioned in the gap 17 between the magnetic segments 14 and 15 in the magnetic block 12 shown as #2. The heat exchanger plates 32 and 33 are positioned in the gap 18 between the magnetic segments 13 and 14 and in the gap 19 between the magnetic segments 15 and 16, in the magnetic block 12 shown as #1.

Likewise, the permanent magnets 22 to 27 in the permanent magnet unit 21 are arranged opposite the magnetic blocks 12 shown as #4, #6, #8, #10, and #12, respectively. The heat exchanger plate 31 is positioned in the gap 17 between the magnetic segments 14 and 15 in each of the magnetic blocks 12 shown as #4, #6, #8, #10, and #12. The heat exchanger plates 32 and 33 are positioned in the gap 18 between the magnetic segments 13 and 14 and in the gap 19 between the magnetic segments 15 and 16, in each of the magnetic block 12 shown as #3, #5, #9, and #11.

In this state, each of the permanent magnets 22 to 27 of the permanent magnet unit 21 applies a magnetic field to the magnetic block 12 located opposite this permanent magnet. This lowers the temperature of the magnetic segments 13 and 15 with the negative characteristic, while raising the temperature of the magnetic segments 14 and 16 with the positive characteristic. In this arrangement, the heat exchanger plate 31 is positioned so as to fill the gap 17 between the magnetic segments 14 and 15. This enables heat conduction-based heat transportation in the direction of arrow A21 in FIG. 3A from the magnetic segment 14 with the raised temperature to the magnetic segment 15 with the lowered temperature. In this arrangement, in the same magnetic block 12, temperature gradients are also created between the magnetic segments 13 and 14 and between the magnetic segments 15 and 16. However, no heat exchanger plates are present but air layers are formed, in the gaps 18 and 19. Consequently, the heat insulating effect of the air layers significantly reduces the heat transportation based on heat conduction.

On the other hand, the magnetic field has been removed from the magnetic blocks 12 shown as #1, #3, #5, #7, #9, and #11. This raises the temperature of the magnetic segments 13 and 15 with the negative characteristic, while lowering the temperature of the magnetic segments 14 and 16 with the positive characteristic. On this occasion, the heat exchanger plate 32 is positioned so as to fill the gap 18 between the magnetic segments 13 and 14. This enables heat conduction-based heat transportation in the direction of arrow A22 in FIG. 3 from the magnetic segment 13 with the raised temperature to the magnetic segment 14 with the lowered temperature. At the same time, the heat exchanger plate 33 is positioned so as to fill the gap 19 between the magnetic segments 15 and 16. This enables heat conduction-based heat transportation in the direction of arrow A23 in FIG. 3 from the magnetic segment 15 with the raised temperature to the magnetic segment 16 with the lowered temperature. In this case, in the same magnetic block 12, a temperature gradient is also created between the magnetic segments 14 and 15. However, no heat exchanger plate is present but an air layer is formed, in the gap 17. Consequently, the heat insulating effect of the air layer significantly reduces the heat transportation based on heat conduction.

Thus, when the positional relationship among the magnetic unit 11 and permanent magnet unit 21 and heat exchanger plates 31, 32, and 33 is as shown in FIGS. 3A to 3C, heat is transported only in the directions shown by arrows A21, A22, and A23 in FIG. 3A, that is, from the inner to outer diameter of the magnetic unit 11.

Then, as described above, the permanent magnet unit 21 and heat exchanger plates 31, 32, and 33 are rotated relative to the fixed magnetic unit 11 to alternately establish the positional relationships shown in FIGS. 2A to 2C and 3A to 3C. This allows heat to be continuously transported from the inner to outer diameter of the magnetic unit 11 along the entire circumference of the magnetic unit 11. Consequently, heat is always transported from the lower-temperature heat exchanger 51, located on the inner diameter side of the magnetic unit 11, to the higher-temperature heat exchanger 52, located on the outer diameter side. This allows the whole refrigerator to function.

Accordingly, in each magnetic block 12, the positive and negative magnetic segments 13 to 16 are alternately arranged via the predetermined gaps 17 to 19. The magnetic unit 11 is annularly formed of the plurality of circumferentially arranged magnetic blocks 12. The permanent magnet unit 21 is placed opposite the magnetic unit 11 so that each of the permanent magnets 22 to 27, having the same shape as that of the magnetic block 12, is placed for every two magnetic blocks 12. In the thus configured magnetic refrigerator, the permanent magnet unit 21 is rotated to alternately apply a magnetic field to the magnetic blocks 12. At the same time, the heat exchanger plates 31, 32, and 33 are interposed into the gaps 17 to 19, respectively. This enables heat transportation based on heat conduction to occur in the magnetic unit 11 in one direction. In this magnetic refrigerator, the heat transportation in the magnetic unit 11 continuously occurs from the inner to outer diameter of the magnetic unit 11 along the entire circumference of the magnetic unit 11. This enables a high cooling effect to be maintained. Since the heat transportation for cooling heat is realized by solid heat conduction, conventional facilities such as a channel and driving mechanism can be eliminated which are required to transport a medium such as a liquid or gas which is used to transport heat. This simplifies the system configuration and handling and enables a reduction in the size of the whole apparatus and in costs.

A high-heat-conductivity material with excellent heat conduction, for example, copper or aluminum, is used for the heat exchanger plates 31, 32, and 33, interposed into the gaps 17 to 19, formed among the magnetic segments 13 to 16. This improves the heat conduction with the heat exchanger plates 31, 32, and 33 interposed among the magnetic segments 13 to 16, which constitute the magnetic block 12. Moreover, efficient solid heat conduction can be achieved.

The system is also provided with the function for supplying the gaps 17, 18, and 19 with heat conducting grease or lubricant. This makes it possible to inhibit the heat exchanger plates 31, 32, and 33 and magnetic segments 13 to 16 from being worn to reduce the contact thermal resistance between the heat exchanger plates 31, 32, and 33 and magnetic segments 13 to 16. This further improves the heat conduction between the heat exchanger plates 31, 32, and 33 and magnetic segments 13 to 16.

Second Embodiment

Now, description will be given of a magnetic refrigerator according to a second embodiment.

FIGS. 7A to 7C and 8A to 8C are schematic plan views of the magnetic unit 11, a permanent magnet unit 61, and heat exchanger plates 71, 72, and 73 which constitute the magnetic refrigerator according to the second embodiment. The magnetic unit 11 shown in FIG. 7A is similar to that described with reference to FIG. 2A. Accordingly, the same components as those in FIG. 2A are denoted by the same reference numerals with their description omitted.

The permanent magnet unit 61 is placed opposite the magnetic unit 11. The permanent magnet unit 61 is composed of a plurality of, in the example shown in FIG. 7B, six permanent magnets 62 to 67 having the same shape as that of the magnetic blocks 12 as shown in FIG. 7B. Each of the permanent magnets 62 to 67 is placed for every magnetic block 12 arranged in the circumferential direction of the magnetic unit 11. The permanent magnets 62 to 67 are spaced from one another. Each of the permanent magnets 62 to 67 has a permanent magnet piece 68A shaped almost equally to the combination of the magnetic segments 13 and 14, constituting the magnetic block 12, and a permanent magnet piece 68B shaped almost equally to the combination of the magnetic segments 15 and 16, constituting the magnetic block 12. The permanent magnet pieces 68A and 68B are arranged opposite the magnetic segments 13 to 16. Each of the permanent magnets 62 to 67 may be composed of separate magnetic permanent magnet pieces shaped almost equally to the respective magnetic segments 13 to 16. This the permanent magnet unit 61 is shaped like a hub which is concentric with the magnetic unit 11 and which has an inner and outer diameters almost equal to those of the magnetic unit 11. As described with reference to FIG. 4, the permanent magnet unit 61 is supported on and is rotatable with the second yoke 43. This rotation constitutes a magnetic field increasing and reducing unit that increases and reduces the magnitude of a magnetic field for each magnetic block 12. The second yoke 43, which supports the permanent magnet unit 61, is fixed to the rotating shaft 2 as described with reference to FIG. 1. Rotation of the rotating shaft 2 rotates the second yoke 43 at a predetermined speed together with the permanent magnet unit 21.

The permanent magnets 62 to 67, each of which is composed of the permanent magnet pieces 68A and 58B, are thus shaped to generally cover the top surface of the magnetic segments 13 to 16 of the corresponding magnetic block 12. Each of the permanent magnets 62 to 67 is placed for every two magnetic blocks 12. As the permanent magnet unit 61 rotates, a magnetic field is alternately applied to and removed from each magnetic block 12. In the magnetic refrigerator shown in FIGS. 7A to 7C, the 12 magnetic blocks 12 are arranged along the circumference of the magnetic unit 11. The six permanent magnets 62 to 67 constitute the hub-shaped permanent magnet unit 61.

FIG. 7C shows the heat exchanger plates 71, 72, and 73, arranged concentrically with the magnetic unit 11. The heat exchanger plates 71, 72, and 73 are composed of a high-heat-conductivity material with excellent heat conduction, for example, copper or aluminum. The heat exchanger plates 71, 72, and 73 are arranged along the radial direction of the magnetic unit 11 and each arranged in the circumferential directions of the magnetic unit 11. The heat exchanger plates 71, 72, and 73 rotate integrally with the permanent magnet unit 61 and yoke 43. In this embodiment, the heat exchanger plates 71, 72, and 73 project from the second yoke 43. Each heat exchanger plate 71 projects from between the permanent magnet pieces 68A and 69B of each permanent magnet 62 to 67.

The heat exchanger plates 71, 72, and 73 are arranged so as to pass through the gaps 17 to 19, formed circumferentially among the magnetic segments 13 to 16, constituting the magnetic block 12. In this case, the heat exchanger plates 71 pass through the gap 17 between the magnetic segments 14 and 15. The heat exchanger plates 72 pass through the gap 18 between the magnetic segments 13 and 14. The heat exchanger plates 73 pass through the gap 19 between the magnetic segments 15 and 16. The heat exchanger plates 71, 72, and 73, arranged in the gaps 17 to 19, respectively, are as long as the corresponding magnetic segments 13 to 16 along the circumferential direction.

Now, description will be given of operation of the magnetic refrigerator configured as described above.

In this magnetic refrigerator, the magnetic unit 11, permanent magnet unit 61, and heat exchanger plates 71, 72, and 73 are concentrically arranged. The magnetic unit 11 is fixed. The permanent magnet unit 61 and heat exchanger plates 71, 72, and 73 are integrally rotated.

At a certain moment, the magnetic unit 11, permanent magnet unit 61, and heat exchanger plates 71, 72, and 73 are arranged so as to have such a positional relationship as shown in FIG. 7A. In this arrangement, the permanent magnet 62 to 67 of the permanent magnet unit 61 are placed opposite the magnetic blocks 13 to 16 of the magnetic blocks 12 shown as #1, #3, #5, #7, and #9. The heat exchanger plate 71 is positioned in the gap 17 between the magnetic segments 14 and 15 in each of the magnetic blocks 12 shown as #1, #3, #5, #7, #9, and #11. The heat exchanger plates 72 and 73 are positioned in the gap 18 between the magnetic segments 13 and 14 and in the gap 19 between the magnetic segments 15 and 16, in each of the magnetic blocks 12 shown as #2, #4, #6, #8, #10, and #12.

In this state, the permanent magnet pieces 68A and 68B, constituting each of the permanent magnets 62 to 67, apply magnetic fields to the magnetic segments 13 to 16 of the magnetic block 12 located opposite these permanent magnet pieces. This lowers the temperature of the magnetic segments 13 and 15 with the negative characteristic, while raising the temperature of the magnetic segments 14 and 16 with the positive characteristic. On this occasion, the heat exchanger plate 71 is positioned so as to fill the gap 17 between the magnetic segments 14 and 15. This enables heat conduction-based heat transportation in the direction of arrow B11 in FIG. 7A from the magnetic segment 14 with the raised temperature to the magnetic segment 15 with the lowered temperature. In this case, in the same magnetic block 12, temperature gradients are also created between the magnetic segments 13 and 14 and between the magnetic segments 15 and 16. However, no heat exchanger plates are present but air layers are formed, in the gaps 18 and 19. Consequently, the heat insulating effect of the air layers significantly reduces the heat transportation based on heat conduction.

On the other hand, the magnetic field has been removed from the magnetic blocks 12 shown as #2, #4, #6, #8, #10, and #12. This raises the temperature of the magnetic segments 13 and 15 with the negative characteristic, while lowering the temperature of the magnetic segments 14 and 16 with the positive characteristic. On this occasion, the heat exchanger plate 72 is positioned so as to fill the gap 18 between the magnetic segments 13 and 14. This enables heat conduction-based heat transportation in the direction of arrow B12 in FIG. 7A from the magnetic segment 13 with the raised temperature to the magnetic segment 14 with the lowered temperature. At the same time, the heat exchanger plate 73 is positioned so as to fill the gap 19 between the magnetic segments 15 and 16. This enables heat conduction-based heat transportation in the direction of arrow B12 in FIG. 7A from the magnetic segment 15 with the raised temperature to the magnetic segment 16 with the lowered temperature. In this case, in the same magnetic block 12, a temperature gradient is also created between the magnetic segments 14 and 15. However, no heat exchanger plate is present but an air layer is formed, in the gap 17. Consequently, the heat insulating effect of the air layer significantly reduces the heat transportation based on heat conduction.

Thus, when the positional relationship among the magnetic unit 11 and permanent magnet unit 61 and heat exchanger plates 71, 72, and 73 is as shown in FIG. 7A, heat is transported only in the directions shown by arrows B11, B12, and B13, that is, from the inner to outer diameter of the magnetic unit 11.

Figures 8A, 8B, 8C:
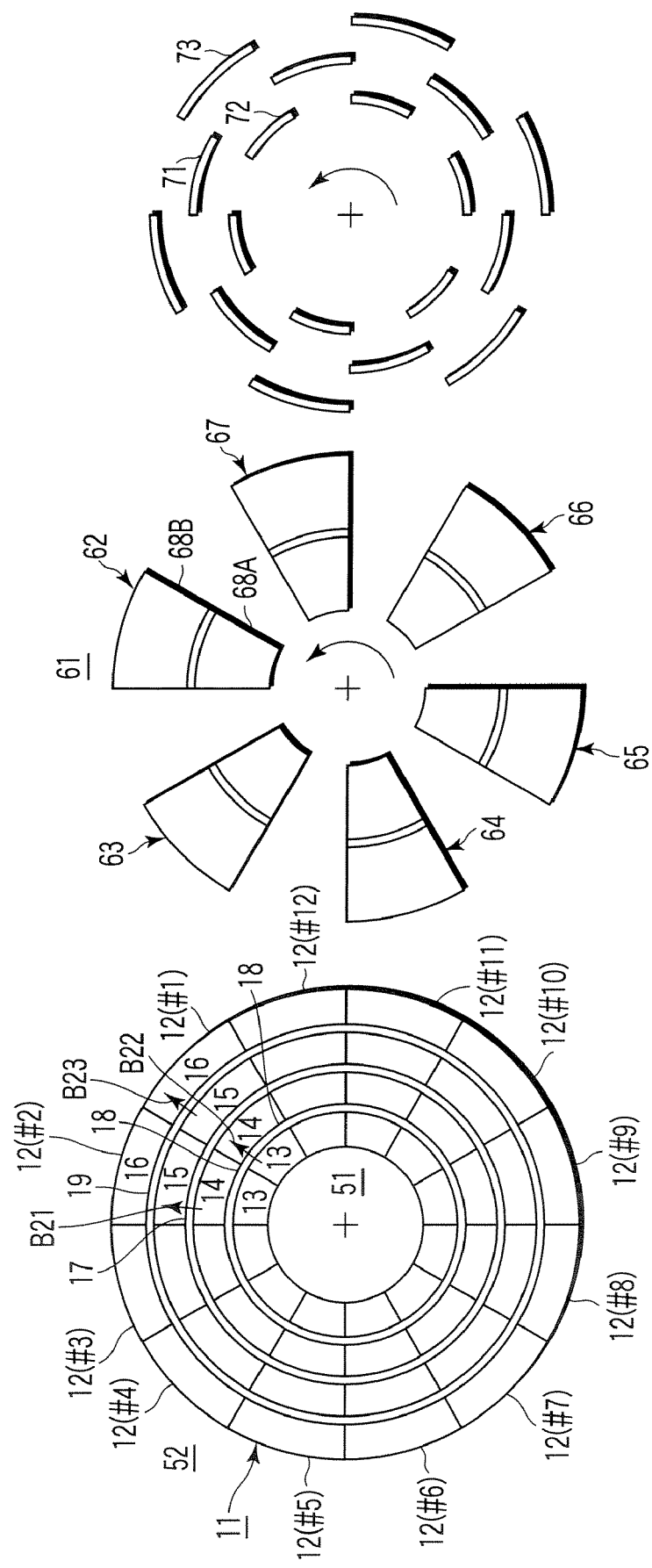
FIGS. 8A to 8C are plan views showing a magnetic unit, a permanent magnetic section, and heat exchanger plates, respectively, which are used in the magnetic refrigerator shown in FIGS. 7A to 7C.

Then, the permanent magnet unit 61 and heat exchanger plates 71, 72, and 73 are further rotated so that the magnetic unit 11, permanent magnet unit 61, and heat exchanger plates 71, 72, and 73 are arranged so as to have such a positional relationship as shown in FIGS. 8A to 8C. In this arrangement, the permanent magnets 62 to 67 of the permanent magnet unit 61 are placed opposite the magnetic blocks 12 shown as #2, #4, #6, #8, #10, and #12. The heat exchanger plate 71 is positioned in the gap 17 between the magnetic segments 14 and 15 in each of the magnetic blocks 12 shown as #2, #4, #6, #8, #10, and #12. The heat exchanger plates 72 and 73 are positioned in the gap 18 between the magnetic segments 13 and 14 and in the gap 19 between the magnetic segments 15 and 16, in each of the magnetic blocks 12 shown as #1, #3, #5, #7, #9, and #11.

In this state, the permanent magnet pieces 68A and 68B constituting each of the permanent magnets 62 to 67 apply magnetic fields to the magnetic segments 13 to 16 of the magnetic block 12 located opposite these permanent magnet pieces. This lowers the temperature of the magnetic segments 13 and 15 with the negative characteristic, while raising the temperature of the magnetic segments 14 and 16 with the positive characteristic. On this occasion, the heat exchanger plate 71 is positioned so as to fill the gap 17 between the magnetic segments 14 and 15. This enables heat conduction-based heat transportation in the direction of arrow B21 in FIG. 8A from the magnetic segment 14 with the raised temperature to the magnetic segment 15 with the lowered temperature. In the same magnetic block 12, temperature gradients are also created between the magnetic segments 13 and 14 and between the magnetic segments 15 and 16. However, no heat exchanger plates are present but air layers are formed, in the gaps 18 and 19. Consequently, the heat insulating effect of the air layers significantly reduces the heat transportation based on heat conduction.

On the other hand, the magnetic field has been removed from the magnetic blocks 12 shown as #1, #3, #5, #7, #9, and #11. This raises the temperature of the magnetic segments 13 and 15 with the negative characteristic, while lowering the temperature of the magnetic segments 14 and 16 with the positive characteristic. On this occasion, the heat exchanger plate 72 is positioned so as to fill the gap 18 between the magnetic segments 13 and 14. This enables heat conduction-based heat transportation in the direction of arrow B22 in FIG. 8 from the magnetic segment 13 with the raised temperature to the magnetic segment 14 with the lowered temperature. At the same time, the heat exchanger plate 73 is positioned so as to fill the gap 19 between the magnetic segments 15 and 16. This enables heat conduction-based heat transportation in the direction of arrow B23 in FIG. 8A from the magnetic segment 15 with the raised temperature to the magnetic segment 16 with the lowered temperature. In this case, in the same magnetic block 12, a temperature gradient is also created between the magnetic segments 14 and 15. However, no heat exchanger plate is present but an air layer is formed, in the gap 17. Consequently, the heat insulating effect of the air layer significantly reduces the heat transportation based on heat conduction.

Thus, when the positional relationship among the magnetic unit 11 and permanent magnet unit 61 and heat exchanger plates 71, 72, and 73 is as shown in FIGS. 8A to 8C, heat is transported in the directions shown by arrows B21, B22, and B23 in FIG. 8A, that is, from the inner to outer diameter of the magnetic unit 11.

Then, as described above, the permanent magnet unit 61 and heat exchanger plates 71, 72, and 73 are rotated relative to the fixed magnetic unit 11 to alternately establish the positional relationships shown in FIGS. 7A to 7C and 8A to 8C. This allows heat to be continuously transported from the inner to outer diameter of the magnetic unit 11 along the entire circumference of the magnetic unit 11. Consequently, heat is always transported from the lower-temperature heat exchanger 51, located on the inner diameter side of the magnetic unit 11, to the higher-temperature heat exchanger 52, located on the outer diameter side. This allows the whole refrigerator to function.

This embodiment thus exerts effects similar to those of the first embodiment. Each of the permanent magnets 62 to 67, constituting the permanent magnet unit 61, has the permanent magnet piece 68A shaped almost equally to the combination of the magnetic segments 13 and 14, constituting the magnetic block 12, and the permanent magnet piece 68B shaped almost equally to the combination of the magnetic segments 15 and 16, constituting the magnetic block 12. The permanent magnet pieces 68A and 68B are arranged opposite the magnetic segments 13 to 16 so as to apply magnetic fields to them. This ensures that the magnetic segments 13 to 16 operate on magnetic fields. A higher cooling effect is thus expected.

(Variation 1)

In the first and second embodiments, the same component is used for the magnetic segments 13 to 16, constituting each of the plural magnetic blocks 12 of the magnetic unit 11. However, the magnetic segments composed of different components may be arranged so that the operating temperature of the magnetic material segment gradually lowers from the outer-peripheral higher-temperature heat exchanger 52 toward the center-axis-side lower-temperature heat exchanger 51. For example, the operating temperature of the magnetic segment 13 is defined as T1, and the operating temperature of the magnetic segment 14 is defined as T2. The operating temperature of the magnetic segment 15 is defined as T3, and the operating temperature of the magnetic segment 16 is defined as T4. Then, the magnetic segments are composed of different components so that $T1 \leq T2 \leq T3 \leq T4$. This provides a refrigerator in which temperature gradually lowers from the higher-temperature heat exchanger 52 to the lower-temperature heat exchanger 51.

The present invention is not limited to the above embodiments. In implementation, various changes may be made to the embodiments without departing from the spirit of the present invention. For example, in the description of the above embodiments, the annular magnetic unit 11 has the plurality of magnetic blocks 12 arranged along its circumference. However, the magnetic unit 11 may be partly notched so as to be almost annular or may be shaped like a circular arc. Even with the single magnetic block 12, a magnetic refrigerator based on solid heat conduction can be constructed by providing the magnetic block 12 with the permanent magnet unit 21 and heat exchanger plates 31, 32, and 33, constituting a magnetic field increasing and reducing unit.

In the above embodiments, the magnetic unit 11 has the 12 magnetic blocks 12 arranged along its circumference and each having the four fan-shaped magnetic segments 13 to 16. However, the numbers of magnetic blocks and magnetic segments constituting the magnetic blocks may be appropriately selected. Further, the single magnetic refrigerator is described in the above embodiments as shown in FIG. 1. However, a refrigerator with an increased capacity can be provided by joining a plurality of such magnetic refrigerators as described in the above embodiments, in the direction of a rotating shaft, and rotatively driving the permanent magnet sections of these magnetic refrigerators via the common rotating shaft. Moreover, in the examples in the above embodiments, the magnetic field increasing and reducing unit is composed mainly of permanent magnets. However, electromagnets may replace the permanent magnets.

According to the embodiments, there can be provided a small-sized, inexpensive magnetic refrigerator which can exert a high cooling effect based on solid heat conduction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic refrigerator comprising:
   a generating unit which generates a magnetic field increased and reduced alternately;
   a magnetic block including positive and negative magnetic segments which are alternately arranged with gaps and to which the magnetic field is applied, the positive magnetic segments producing heat depending on the increasing of the magnetic field and absorbing heat depending on the decreasing of the magnetic field, and the negative magnetic segments producing heat depending on the decreasing of the magnetic field and absorbing heat depending on the increasing of the magnetic field; and
   a heat conducting unit configured to conduct heat between the positive and negative magnetic segments, which includes a conducting member which is inserted into the gap and removed from the gap, alternately, in accordance with the increasing or decreasing of the magnetic field, the positive and negative magnetic segments and the conducting member forming a heat conducting path in the magnetic block.

2. The magnetic refrigerator according to claim 1, further comprising a first heat exchanging unit configured to absorb heat, which is thermally coupled to the magnetic block at a lower-temperature side of the heat conduction path, and a second heat exchanging unit configured to dissipate heat, which is thermally coupled to the magnetic block at a higher-temperature side of the heat conduction path.

3. The magnetic refrigerator according to claim 1, wherein the generating unit comprises a permanent magnet and a driving unit which moves the permanent magnet above the magnetic block, the permanent magnet being alternately close to the magnetic block and apart from the magnetic block.

4. The magnetic refrigerator according to claim 3, wherein the conducting member is moved with permanent magnet by the driving unit and inserted into and removed from the gap, alternately.

5. The magnetic refrigerator according to claim 2, wherein the magnetic segments are arranged so that operating temperature is gradually lowered from the first exchanging unit toward the second heat exchanging unit to form the heat conducting path.

6. A magnetic refrigerator comprising:
   a generating unit which generates a magnetic field increased and reduced, alternately;
   a magnetic unit having a circumferential direction and a radial direction, which includes magnetic blocks arranged in a circumferential direction, each of the magnetic blocks including an arrangement of positive and negative magnetic segments which are alternately arranged in the radial direction with gaps and to which the magnetic field is applied, the positive magnetic segments producing heat depending on the increasing of the magnetic field and absorbing heat depending on the decreasing of the magnetic field, and the negative magnetic segments producing heat depending on the decreasing of the magnetic field and absorbing heat depending on the increasing of the magnetic field; and
   a heat conducting unit configured to conduct heat between the positive and negative magnetic segments, which includes conducting members each of which is inserted into the corresponding gap and removed from the corresponding gap, alternately, in accordance with the increasing or decreasing of the magnetic field, the positive and negative magnetic segments and the conducting member forming a heat conducting path in the magnetic block.

7. The magnetic refrigerator according to claim 6, further comprising a first heat exchanging unit configured to absorb heat, which is thermally coupled to the magnetic block or blocks at a lower-temperature side of the heat conduction path, and a second heat exchanging unit configured to dissipate heat, which is thermally coupled to the magnetic block at a higher-temperature side of the heat conduction path.

8. The magnetic refrigerator according to claim 6, wherein the generating unit comprises permanent magnets arranged above the magnetic blocks, and a driving unit which rotate the permanent magnets above the magnetic blocks along the circumferential direction.

9. The magnetic refrigerator according to claim 8, wherein the driving unit include a rotating shaft rotating the permanent magnets.

10. The magnetic refrigerator according to claim 8, wherein the arrangement of the magnetic segments corresponding to each of the magnetic blocks have a first shape and a first size, and each of the permanent magnets have a second shape and a second size same as the first shape and the first size.

11. The magnetic refrigerator according to claim 8, wherein the driving unit rotates the conducting members with the permanent magnets.

12. The magnetic refrigerator according to claim 7, wherein the magnetic segments are so arranged that operating temperature is gradually lowered from the first exchanging unit toward the second heat exchanging unit to form the heat conducting path.

13. The magnetic refrigerator according to claim 7, wherein the permanent magnet includes permanent magnet pieces, each of the permanent magnet pieces having the same shapes as that of the magnetic segment.

14. The magnetic refrigerator according to claim 7, wherein heat conducting grease or lubricant is applied to the gap.

15. The magnetic refrigerator comprising:
   a permanent magnet unit including permanent magnets, the permanent magnets being so separately arranged along a circumferential direction as to form a substantially hub shape and have a first inner and outer diameters in a radial direction;

a rotating unit having a rotating shaft which supports the permanent magnet unit, configured to rotate the permanent magnet unit with the rotating shaft to produce a rotating magnetic field which is alternately increased and reduced depending on the rotation of the permanent magnet along the circumferential direction;

a magnetic unit substantially formed into a hollow disk shape having a hollow space and a second inner and outer diameters which are substantially equal to the first inner and outer diameters, the magnetic unit including magnetic blocks arranged in the circumferential direction and concentric with the permanent magnet unit, every two of the magnetic blocks corresponding to each of the permanent magnets, each of the magnetic blocks including an arrangement of positive and negative magnetic segments which are alternately arranged in the radial direction with gaps, the positive magnetic segments producing heat depending on the increasing of the magnetic field and absorbing heat depending on the decreasing of the magnetic field, and the negative magnetic segments producing heat depending on the decreasing of the magnetic field and absorbing heat depending on the increasing of the magnetic field; and a heat conducting unit configured to conduct heat between the positive and negative magnetic segments, which includes conducting members each of which is inserted into the corresponding gap and removed from the corresponding gap, alternately, in accordance with the increasing or decreasing of the magnetic field, the positive and negative magnetic segments and the conducting member forming a heat conducting path in the magnetic block.

16. The magnetic refrigerator according to claim 15, wherein the further comprising a first heat exchanging unit configured to absorb heat, which is thermally coupled to the magnetic block at a lower-temperature side of the heat conduction path, and a second heat exchanging unit configured to dissipate heat, which is thermally coupled to the magnetic block at a higher-temperature side of the heat conduction path.

17. The magnetic refrigerator according to claim 15, wherein the first heat exchanging unit is located in the hollow space of the magnetic unit and the second heat exchanging unit is located at the peripheral side of the magnetic unit.

18. The magnetic refrigerator according to claim 15, wherein the permanent magnet unit is faced to the magnetic unit with a gap between the permanent magnet unit and the magnetic unit.

19. The magnetic refrigerator according to claim 15, further comprising first and second yokes, a heat insulating member mounted on the first yoke, the magnetic unit being mounted on the heat insulating member and the second yoke being mounted on the permanent magnet unit so that the second yoke is rotated with the permanent magnet.

20. The magnetic refrigerator according to claim 19, wherein the first yoke is concentric with the magnetic unit and has third inner and outer diameters substantially equal to the second inner and outer diameters, and the second yoke is concentric with the magnetic unit and has fourth inner and outer diameters the second inner and outer diameters.

21. The magnetic refrigerator according to claim 15, wherein the heat conducting member has a circumferential length substantially equal to a circumferential length of the magnetic segment.

22. The magnetic refrigerator according to claim 15, wherein the magnetic segments are so arranged that operating temperature is gradually lowered from the first exchanging unit toward the second heat exchanging unit to form the heat conducting path.

23. The magnetic refrigerator according to claim 15, wherein heat conducting grease or lubricant is applied to the gap.

* * * * *